US012592867B2

(12) United States Patent
Li

(10) Patent No.: US 12,592,867 B2
(45) Date of Patent: Mar. 31, 2026

(54) METHOD FOR ESTABLISHING NETWORK CONNECTION AND APPARATUS

(71) Applicant: HUAWEI TECHNOLOGIES CO., LTD., Shenzhen (CN)

(72) Inventor: Shitao Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 328 days.

(21) Appl. No.: 18/335,020

(22) Filed: Jun. 14, 2023

(65) Prior Publication Data

US 2023/0327959 A1      Oct. 12, 2023

Related U.S. Application Data

(63) Continuation of application No. PCT/CN2020/136584, filed on Dec. 15, 2020.

(51) Int. Cl.
*H04L 41/40*          (2022.01)
*G06F 9/455*          (2018.01)
(Continued)

(52) U.S. Cl.
CPC .......... *H04L 41/40* (2022.05); *G06F 9/45558* (2013.01); *H04L 41/0806* (2013.01); *H04L 41/0895* (2022.05)

(58) Field of Classification Search
CPC . H04L 41/40; H04L 41/0806; H04L 41/0895; H04L 41/5054; G06F 2009/45595; G06F 9/45558
See application file for complete search history.

(56) References Cited

U.S. PATENT DOCUMENTS

| | | | |
|---|---|---|---|
| 10,931,526 B1 * | 2/2021 | Jiang | G06F 8/60 |
| 2018/0191581 A1 * | 7/2018 | Yu | H04L 41/042 |

(Continued)

FOREIGN PATENT DOCUMENTS

| | | |
|---|---|---|
| CN | 107154888 A | 9/2017 |
| JP | 2020536434 A | 12/2020 |

OTHER PUBLICATIONS

Extended European Search Report issued in corresponding European Application No. 20965407.8, dated Dec. 11, 2023, pp. 1-11.

(Continued)

*Primary Examiner* — Redentor Pasia
(74) *Attorney, Agent, or Firm* — HAUPTMAN HAM, LLP

(57) ABSTRACT

A method for establishing a network connection includes receiving first request information from a network function virtualization orchestrator, and establishing a first service access point based on the first request information. The first request information is useable for requesting to establish the first service access point. The first service access point is configured to connect to a connectivity service endpoint via a first network, and is configured to connect to a first virtual link corresponding to an identifier of at least one virtual link descriptor. The identifier of the at least one virtual link descriptor is useable to identify the virtual link descriptor. The virtual link descriptor is useable to indicate a requirement for creating a second virtual link connected to the first service access point. The connectivity service endpoint is configured to connect a data center and a universal transmission network that are managed by a virtualized infrastructure manager.

16 Claims, 7 Drawing Sheets

(51) Int. Cl.
    *H04L 41/0806*     (2022.01)
    *H04L 41/0895*     (2022.01)

(56)         References Cited

U.S. PATENT DOCUMENTS

| | | | |
|---|---|---|---|
| 2018/0205637 A1* | 7/2018 | Li | H04L 67/141 |
| 2019/0036783 A1* | 1/2019 | Xu | H04L 41/40 |
| 2019/0056975 A1* | 2/2019 | Yu | H04L 41/0895 |
| 2019/0068463 A1* | 2/2019 | Li | H04L 41/0806 |
| 2019/0089588 A1* | 3/2019 | Xu | H04L 49/253 |
| 2019/0140921 A1 | 5/2019 | Xu et al. | |
| 2019/0173802 A1* | 6/2019 | Xia | H04L 41/5045 |
| 2020/0322232 A1 | 10/2020 | Xia | |

OTHER PUBLICATIONS

Japanese Office Action issued in corresponding Japanese Patent Application No. 2023-536074, dated Jul. 23, 2024, pp. 1-7.

* cited by examiner

101

102

METHOD FOR ESTABLISHING NETWORK CONNECTION AND APPARATUS

CROSS-REFERENCE TO RELATED APPLICATIONS

This application is a continuation of International Application No. PCT/CN2020/136584, filed on Dec. 15, 2020, the disclosure of which is hereby incorporated by reference in its entirety.

TECHNICAL FIELD

This application relates to the network function virtualization (NFV) field, and in particular, to a method for establishing a network connection and an apparatus.

BACKGROUND

At present, a network deployed by a network operator includes various hardware devices. These hardware devices may be dedicated devices or general-purpose devices. In a development process of internet technologies, the network operator needs to develop a new network service (NS). Each time the network operator develops a new network service, a new type of hardware device needs to be deployed in a network accordingly. However, as network services increase, it becomes increasingly difficult to determine spatial locations of newly added hardware devices and power supply lines, and deployment of a new network service is severely suppressed.

To resolve the foregoing problem, NFV is proposed. A general-purpose device and a virtualization technology are used in the NFV, so that the general-purpose device can implement a function of a dedicated device in a network of some approaches, thereby reducing expensive costs caused by deployment of the dedicated device. The NFV can implement software and hardware decoupling, and network device functions no longer depend on the dedicated device through the software and hardware decoupling. In addition, resources (for example, various hardware devices) can be fully and flexibly shared by using characteristics of cloud computing in the NFV, to implement rapid development and deployment of the new network service and perform automatic deployment, elastic scaling, fault isolation, and self-healing based on actual network service needs. Therefore, the NFV is increasingly widely applied.

In a case, the NFV may be applied to a data center. One data center may include a plurality of virtual network functions (VNFs). One or more network services may be deployed on the VNF of the data center. If a network service deployed on the VNF of the data center has a requirement for establishing a connection across data centers, that is, when the VNF needs to communicate with a VNF of another data center, an end-to-end network connection needs to be established, that is, a network connection between the VNF and the VNF of the another data center needs to be established.

For example, a network system shown in FIG. 1 is used as an example. When a VNF 1011 of a data center 101 needs to communicate with a VNF 1021 of a data center 102, a connection between the VNF 1011 and a data center gateway (DC GW) 1012, a connection between the DC GW 1012 and a transmission access gateway (GW) 103, a connection between the transmission access GW 103 and a transmission access GW 104, a connection between the transmission access GW 104 and a DC GW 1022, and a connection between the DC GW 1022 and the VNF 1021 need to be established. The connection between the transmission access GW 103 and the transmission access GW 104 may be established by a wide area network (WAN) infrastructure manager (WIM). A virtualized infrastructure manager (VIM) that manages the data center 101 may configure the DC GW 1012, so that the DC GW 1012 establishes the connection to the transmission access GW 103. A VIM that manages the data center 102 may configure the DC GW 1022, so that the DC GW 1022 establishes the connection to the transmission access GW 104. However, currently, there is no specific method for establishing a connection between the VNF 1011 and the DC GW 1012 and establishing a connection between the VNF 1021 and the DC GW 1022.

SUMMARY

One or more embodiments of the present application provide a method for establishing a network connection and an apparatus, to establish a connection between a VNF and a DC GW to implement a network connection across data centers.

To achieve the foregoing objectives, the following technical solutions are used in one or more embodiments of this application.

According to a first aspect, an embodiment of this application provides a method for establishing a network connection, and the method includes: receiving NS instantiation request information from an operation support system/business support system (operations support system and business support system, OSS/BSS); obtaining an identifier of a first service access point descriptor, an identifier of at least one virtual link descriptor, information about a virtual link descriptor corresponding to an identifier of each virtual link descriptor, and information about an external network based on the NS instantiation request information, where the information about the virtual link descriptor indicates a requirement for creating a virtual link connected to a first service access point, the information about the external network includes an identifier of a first network and an identifier of a connectivity service endpoint, the first network is configured to connect the first service access point to the connectivity service endpoint, and the connectivity service endpoint is configured to connect a data center and a universal transmission network that are managed by a virtualized infrastructure manager VIM; and sending first request information to the VIM, where the first request information is for requesting to establish the first service access point, and the first service access point is configured to connect to the connectivity service endpoint via the first network, and is configured to connect to a virtual link corresponding to the identifier of the at least one virtual link descriptor.

Based on the method provided in the first method, the first service access point may be established, so that the first service access point is connected to the connectivity service endpoint via the first network, and the first service access point is connected to the VNF by using a corresponding virtual link, thereby implementing a connection between the VNF and the connectivity service endpoint, for example, a DC GW.

In some embodiments, the NS instantiation request information includes an identifier of an NS instance and information about the external network; and the obtaining an identifier of a first service access point descriptor, an identifier of at least one virtual link descriptor, information about a virtual link descriptor corresponding to an identifier of each virtual link descriptor, and information about an external network based on the NS instantiation request information includes: obtaining, based on the NS instantiation request information, the information about the external network and a network service descriptor (network service descriptor, NSD) file corresponding to the identifier of the NS instance, where the NSD file includes information about the first service access point descriptor and the information about the virtual link descriptor, and the information about the first service access point descriptor includes the identifier of the first service access point descriptor and the identifier of the at least one virtual link descriptor. Based on the foregoing method, the information about the external network may be obtained from the NS instantiation request information, and the identifier of the first service access point descriptor, the identifier of the at least one virtual link descriptor, and the information about the virtual link descriptor corresponding to the identifier of each virtual link descriptor are obtained from the NSD file, so as to send the first request information to the VIM, so that the VIM establishes the first service access point based on the first request information.

In some embodiments, the NS instantiation request information further includes information about a transmission network, the information about the transmission network includes the identifier of the first service access point descriptor, the identifier of the connectivity service endpoint, and an identifier of a second network, and the identifier of the second network is used by the connectivity service endpoint to access the universal transmission network. Based on the foregoing method, the information about the transmission network may be obtained from the NS instantiation request information. In this way, second request information may be sent to the VIM, so that the VIM forwards the second request information to the connectivity service endpoint.

In some embodiments, the method further includes: receiving information about a transmission network from the OSS/BSS, where the information about the transmission network includes the identifier of the first service access point descriptor, the identifier of the connectivity service endpoint, and an identifier of a second network, and the identifier of the second network is used by the connectivity service endpoint to access the universal transmission network. Based on the foregoing method, the information about the transmission network may be obtained. In this way, the second request information may be sent to the VIM, so that the VIM forwards the second request information to the connectivity service endpoint.

In some embodiments, the information about the transmission network is included in an NS instantiation update request. Based on the foregoing method, the information about the transmission network may be carried in the NS instantiation update request.

In some embodiments, the NS instantiation request information includes an identifier of an NS instance; and the obtaining an identifier of a first service access point descriptor, an identifier of at least one virtual link descriptor, information about a virtual link descriptor corresponding to an identifier of each virtual link descriptor, and information about an external network based on the NS instantiation request information includes: obtaining an NSD file corresponding to the identifier of the NS instance, where the NSD file includes information about the first service access point descriptor and the information about the virtual link descriptor, and the information about the first service access point descriptor includes the identifier of the first service access point descriptor, the identifier of the at least one virtual link descriptor, and the information about the external network. Based on the foregoing method, the identifier of the first service access point descriptor, the identifier of the at least one virtual link descriptor, the information about the external network, and the information about the virtual link descriptor may be obtained from the NSD file corresponding to the identifier of the NS instance based on the NS instantiation request information, so as to send the first request information to the VIM, so that the VIM establishes the first service access point based on the first request information.

In some embodiments, the NS instantiation request information further includes information about a transmission network, the information about the transmission network includes the identifier of the first service access point descriptor, the identifier of the connectivity service endpoint, and an identifier of a second network, and the identifier of the second network is used by the connectivity service endpoint to access the universal transmission network. Based on the foregoing method, the information about the transmission network may be obtained from the NS instantiation request information. In this way, second request information may be sent to the VIM, so that the VIM forwards the second request information to the connectivity service endpoint.

In some embodiments, the method further includes: sending second request information to the VIM, where the second request information is for requesting to set an interface that connects the connectivity service endpoint to the universal transmission network as the second network, and is for mapping the identifier of the second network to the identifier of the first network on the connectivity service endpoint. Based on the foregoing method, the connectivity service endpoint may be set, so that an interface connecting the connectivity service endpoint to the universal transmission network is a second network, and there is a mapping relationship between the identifier of the second network and the identifier of the first network. In this way, the data center is connected to the universal transmission network through the connectivity service endpoint. In addition, if the network is set by the foregoing method, whether the universal transmission network or a network of another data center is successfully established may not be concerned. In other words, even if the universal transmission network or the network of another data center is not established, the first service access point may be established by using the foregoing method, and the connectivity service endpoint may be set. Subsequently, after the universal transmission network or the network of another data center is established, the network may be connected to the connectivity service endpoint, thereby simplifying a cross-domain network connection process.

In some embodiments, the first network is a deployed network or an undeployed network. Based on the foregoing method, regardless of whether the external network is deployed, the foregoing method may be used to establish a network.

According to a second aspect, an embodiment of this application provides a method for establishing a network connection. The method includes: receiving first request information from an NFV orchestrator (NFV orchestrator, NFVO), where the first request information is for requesting to establish a first service access point, the first service access point is configured to connect to a connectivity service endpoint via a first network, and is configured to connect to a virtual link corresponding to an identifier of at least one virtual link descriptor, where the identifier of the virtual link descriptor identifies the virtual link descriptor, the virtual link descriptor indicates a requirement for creating a virtual link connected to the first service access point, and the connectivity service endpoint is configured to connect a data center and a universal transmission network that are managed by a virtualized infrastructure manager VIM; and establishing the first service access point based on the first request information.

According to the method provided in the second aspect, the first service access point may be established, so that the first service access point is connected to the connectivity service endpoint via the first network, and the first service access point is connected to the VNF by using a corresponding virtual link, thereby implementing a connection between the VNF and the connectivity service endpoint, for example, a DC GW.

In some embodiments, the method further includes: receiving second request information from the NFVO, where the second request information is for requesting to set an interface that connects the connectivity service endpoint to the universal transmission network as a second network, and is for mapping an identifier of the second network to an identifier of the first network on the connectivity service endpoint, and the identifier of the second network is used by the connectivity service endpoint to access the universal transmission network; and sending the second request information to the connectivity service endpoint. Based on the foregoing method, the connectivity service endpoint may be set, so that an interface connecting the connectivity service endpoint to the universal transmission network is a second network, and there is a mapping relationship between the identifier of the second network and the identifier of the first network. In this way, the data center is connected to the universal transmission network through the connectivity service endpoint. In addition, if the network is set by the foregoing method, whether the universal transmission network or a network of another data center is successfully established may not be concerned. In other words, even if the universal transmission network or the network of another data center is not established, the first service access point may be established by using the foregoing method, and the connectivity service endpoint may be set. Subsequently, after the universal transmission network or the network of another data center is established, the network may be connected to the connectivity service endpoint, thereby simplifying a cross-domain network connection process.

In some embodiments, the first network is a deployed network or an undeployed network. Based on the foregoing method, regardless of whether the external network is deployed, the foregoing method may be used to establish a network.

According to a third aspect, an embodiment of this application provides a communication apparatus, to implement the method according to any one of the first aspect or the possible implementations of the first aspect. The apparatus includes a corresponding unit or component configured to perform the foregoing method. The unit included in the apparatus may be implemented by software and/or hardware. The apparatus may be, for example, a terminal, or a chip, a chip system, or a processor that can support the terminal in implementing the foregoing method.

According to a fourth aspect, an embodiment of this application provides a communication apparatus, to implement the method according to any one of the second aspect or the possible implementations of the second aspect. The apparatus includes a corresponding unit or component configured to perform the foregoing method. The unit included in the apparatus may be implemented by software and/or hardware. The apparatus may be, for example, a network device, or a chip, a chip system, or a processor that can support the network device in implementing the foregoing method.

According to a fifth aspect, an embodiment of this application provides a communication apparatus, including a processor, where the processor is coupled to a memory, and the memory is configured to store a program or instructions. When the program or the instructions are executed by the processor, the apparatus is enabled to implement the method according to any one of the first aspect or the possible implementations of the first aspect.

According to a sixth aspect, an embodiment of this application provides a communication apparatus, including a processor, where the processor is coupled to a memory, and the memory is configured to store a program or instructions. When the program or the instructions are executed by the processor, the apparatus is enabled to implement the method according to any one of the second aspect or the possible implementations of the second aspect.

According to a seventh aspect, an embodiment of this application provides a communication apparatus. The apparatus is configured to implement the method according to any one of the first aspect or the possible implementations of the first aspect.

According to an eighth aspect, an embodiment of this application provides a communication apparatus. The apparatus is configured to implement the method according to any one of the second aspect or the possible implementations of the second aspect.

According to a ninth aspect, an embodiment of this application provides a computer-readable medium. The computer-readable medium stores a computer program or instructions. When the computer program or the instructions are executed, a computer is enabled to perform the method according to any one of the first aspect or the possible implementations of the first aspect.

According to a tenth aspect, an embodiment of this application provides a computer-readable medium. The computer-readable medium stores a computer program or instructions. When the computer program or the instructions are executed, a computer is enabled to perform the method according to any one of the second aspect or the possible implementations of the second aspect.

According to an eleventh aspect, an embodiment of this application provides a computer program product. The computer program product includes computer program code. When the computer program code is run on a computer, the computer is enabled to perform the method according to any one of the first aspect or the possible implementations of the first aspect.

According to a twelfth aspect, an embodiment of this application provides a computer program product. The computer program product includes computer program code. When the computer program code is run on a computer, the computer is enabled to perform the method in any one of the second aspect or the possible implementations of the second aspect.

According to a thirteenth aspect, an embodiment of this application provides a chip, including a processor. The processor is coupled to a memory, the memory is configured to store a program or instructions. When the program or the instructions are executed by the processor, the chip is enabled to implement the method according to any one of the first aspect or the possible implementations of the first aspect.

According to a fourteenth aspect, an embodiment of this application provides a chip, including a processor. The processor is coupled to a memory, and the memory is configured to store a program or instructions. When the program or the instructions are executed by the processor, the chip is enabled to implement the method according to any one of the second aspect or the possible implementations of the second aspect.

According to a fifteenth aspect, an embodiment of this application provides a communication system. The system includes the apparatus in the third aspect and/or the apparatus in the fourth aspect, or the system includes the apparatus in the fifth aspect and/or the apparatus in the sixth aspect, or the system includes the apparatus in the seventh aspect and/or the apparatus in the eighth aspect, or the system includes the chip in the thirteenth aspect and/or the chip in the fourteenth aspect.

It may be understood that any communication apparatus, chip, computer-readable medium, computer program product, communication system, or the like provided above is configured to perform a corresponding method provided above. Therefore, for beneficial effects that can be achieved by the communication apparatus, the chip, the computer-readable medium, the computer program product, the communication system, or the like, refer to the beneficial effects in the corresponding method. Details are not described herein again.

DETAILED DESCRIPTION

The following describes implementations of one or more embodiments of the present application in detail with reference to the accompanying drawings.

The method provided in embodiments of this application may be applied to various network systems that require cross-network communication. The following uses a network system 20 shown in FIG. 2 as an example to describe the method provided in embodiments of this application.

Figure 1:
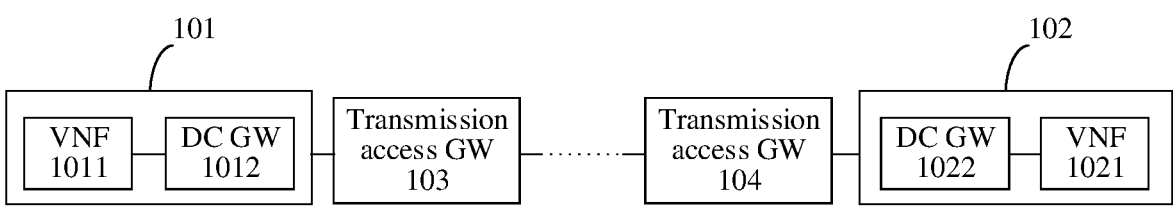
FIG. 1 is a schematic diagram of a network system according to some approaches.
Figure 2:
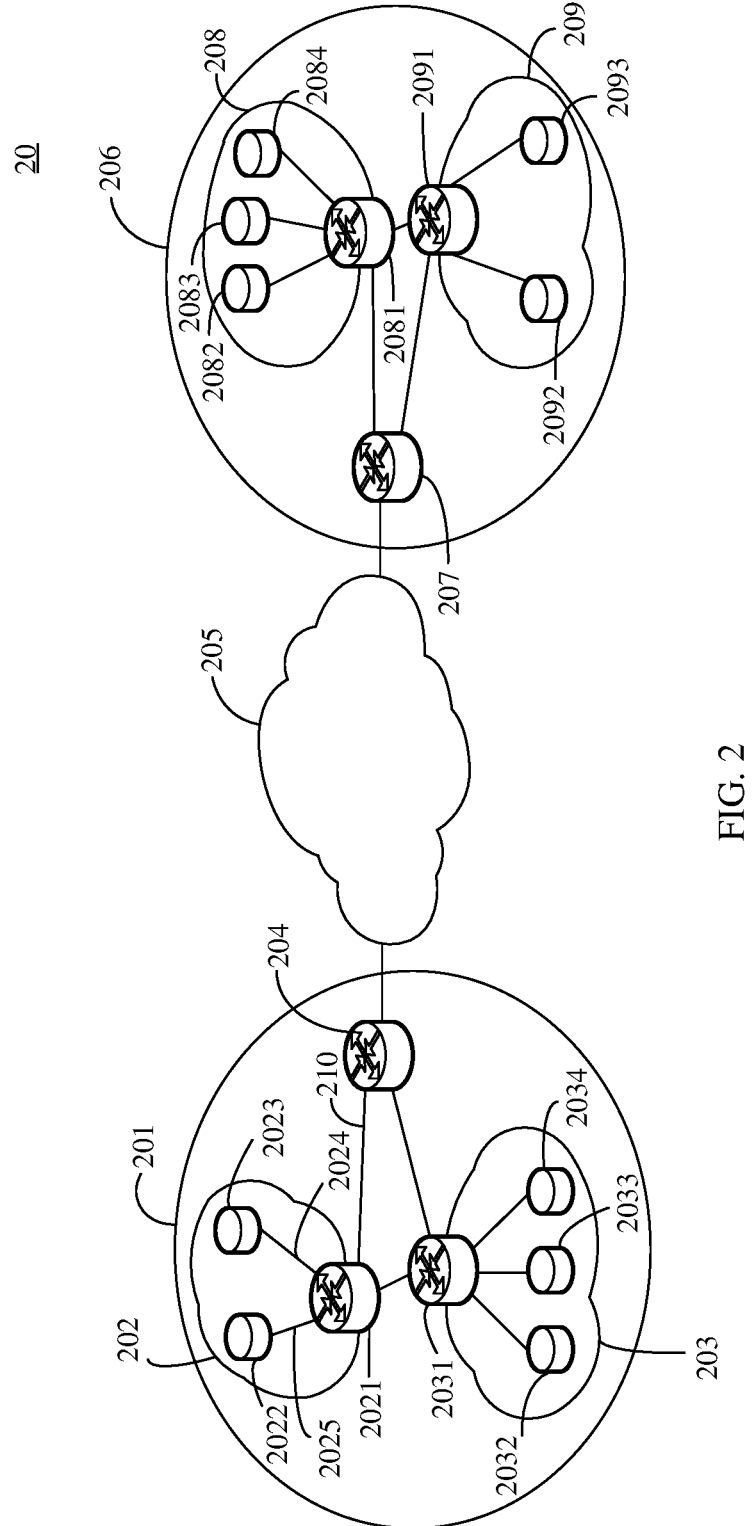
FIG. 2 is a schematic diagram of an architecture of a network system according to an embodiment of this application.

FIG. 2 is a schematic diagram of an architecture of a network system 20 according to an embodiment of this application. In FIG. 2, the network system 20 may include a data center 201, a data center 206, and a universal transmission network 205. The data center 201 and the data center 206 may communicate with each other by using the universal transmission network 205. Further, the data center 201 is communicatively connected to the universal transmission network 205 by using a connectivity service endpoint 204, and the data center 206 is communicatively connected to the universal transmission network 205 by using a connectivity service endpoint 207, to implement communication between the data center 201 and the data center 206.

An NS 202 and an NS 203 are deployed on the data center 201. An NS 208 and an NS 209 are deployed on the data center 206. The NS 202 includes a service access point 2021, and a VNF 2022 and a VNF 2023 that are communicatively connected to the service access point 2021. The NS 203 includes a service access point 2031, and a VNF 2032, a VNF 2033, and a VNF 2034 that are communicatively connected to the service access point 2031. The NS 209 includes a service access point 2091, and a VNF 2092 and a VNF 2093 that are communicatively connected to the service access point 2091. The NS 208 includes a service access point 2081, and a VNF 2082, a VNF 2083, and a VNF 2084 that are communicatively connected to the service access point 2081.

In the data center 201, the service access point 2021 may be communicatively connected to the service access point 2031, and communicatively connected to the connectivity service endpoint 204. The service access point 2031 may be communicatively connected to the service access point 2021, and communicatively connected to the connectivity service endpoint 204. Similarly, in the data center 206, the service access point 2081 may be communicatively connected to the service access point 2091, and communicatively connected to the connectivity service endpoint 207. The service access point 2091 may be communicatively connected to the service access point 2081, and communicatively connected to the connectivity service endpoint 207.

The following specifically describes terms such as a universal transmission network, an NS, a data center, a VNF, a service access point, and a connectivity service endpoint.

The universal transmission network in this embodiment of this application, for example, the universal transmission network 205, may be a WAN, and is configured to connect a plurality of data centers. The universal transmission network may include a plurality of networks.

The NS in this embodiment of this application, for example, the NS 202 or the NS 208, may be various types of NSs, for example, an Internet Protocol (Internet Protocol, IP) multimedia subsystem (IP multimedia subsystem, IMS) network service, or an evolved packet core (evolved packet core, EPC) service.

The data center in this embodiment of this application, for example, the data center 201 or the data center 206, may be configured to transfer, accelerate, display, compute, or store information on a network infrastructure (for example, the VNF 2022 or the VNF 2082).

The VNF in this embodiment of this application, for example, the VNF 2033, may be a virtualized entity having a network function. For example, if a VNF has a mobility management entity (mobile management entity, MME) function, the VNF is a virtual MME. In a specific application, the network function may be deployed on one or more virtual machines (virtual machines, VMs), so that the one or more VMs have the network function.

The service access point in this embodiment of this application may be configured to connect to a connectivity service endpoint via an external network, and is configured to connect to at least one virtual link. The external network may be configured to connect a service access point to a connectivity service endpoint. For example, an external network 210 in FIG. 2 is configured to connect the service access point 2021 to the connectivity service endpoint 204. A virtual link may be configured to connect a service access point and a VNF. For example, the virtual link 2024 in FIG. 2 is configured to connect the service access point 2021 and the VNF 2023, and the virtual link 2025 in FIG. 2 is configured to connect the service access point 2021 and the VNF 2022.

The connectivity service endpoint in this embodiment of this application may be configured to connect a data center and a universal transmission network. For example, the connectivity service endpoint 207 in FIG. 2 may be configured to connect the data center 206 and the universal transmission network 205.

The network system 20 shown in FIG. 2 is merely used as an example, and is not intended to limit technical solutions of this application. A person skilled in the art should understand that, in a specific implementation process, the network system 20 may further include another element, and quantities of NSs, VNFs, connectivity service endpoints, service access points, data centers, and the like may also be determined based on a specific requirement. This is not limited.

Figure 3:
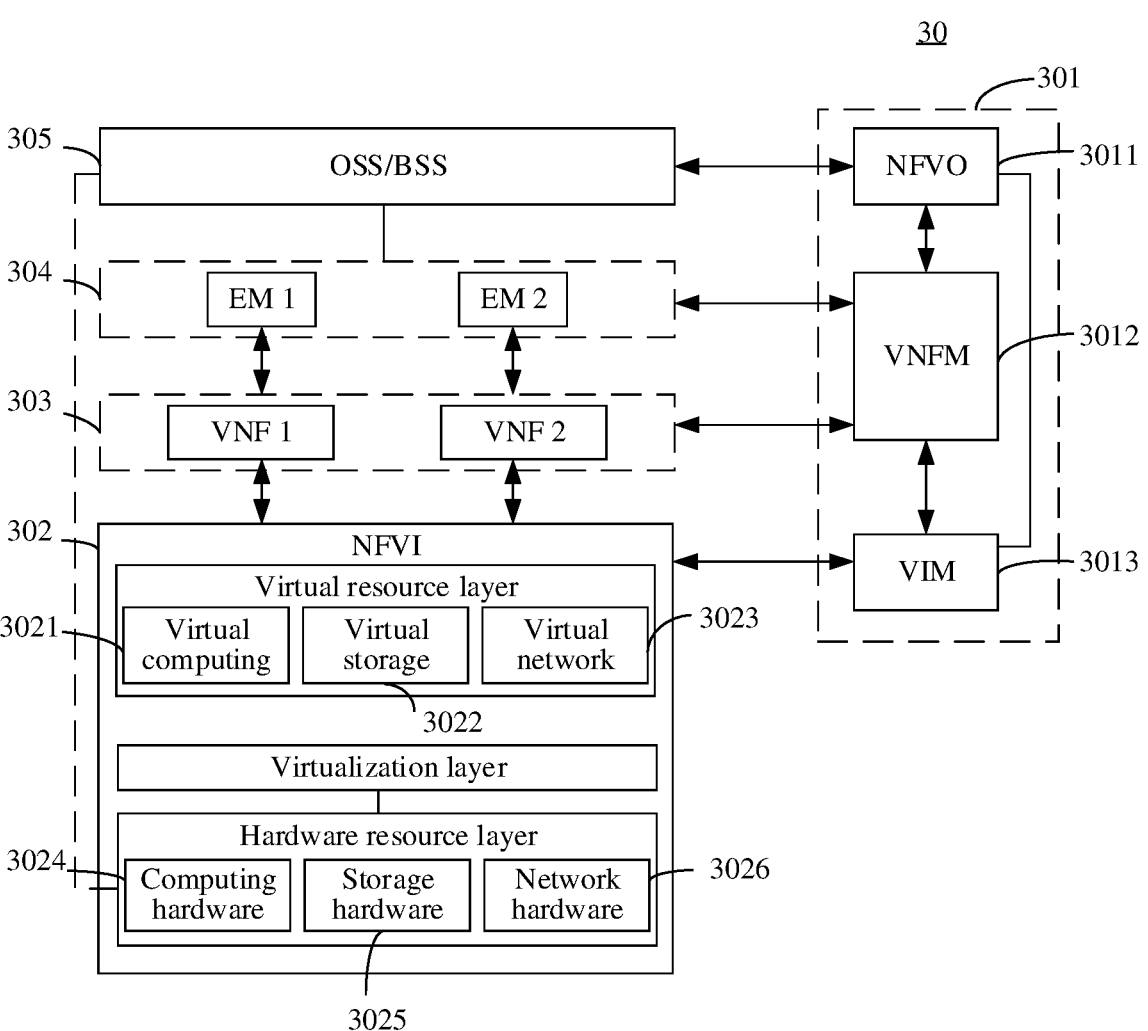
FIG. 3 is a schematic diagram of an architecture of an NFV system according to an embodiment of this application.

Referring to FIG. 3, FIG. 3 is a schematic diagram of an architecture of an NFV system 30 according to an embodiment of this application. The NFV system 30 may be used in various networks, for example, implemented in a data center (the data center 201 or the data center 206 shown in FIG. 2), a carrier network, or a local area network. The NFV system 30 includes an NFV management and orchestration system (NFV management and orchestration, NFV MANO) 301, an NFV infrastructure (NFV infrastructure, NFVI) 302, a plurality of VNFs 303, a plurality of element management (element management, EM) 304, and an operation support system/business support system (operations support system and business support system, OSS/BSS) 305.

The NFV MANO 301 may be configured to monitor and manage the NFVI 302 and the VNF 303. The NFV MANO 301 may include an NFV orchestrator (NFV orchestrator, NFVO) 3011, one or more VNF managers (VNF managers, VNFMs) 3012, and a VIM 3013. The NFVO 3011 may be configured to manage a life cycle of a virtualized service, allocate and schedule a virtual resource in the NFVI 302, and the like. Further, the NFVO 3011 may communicate with one or more VNFMs 3012 to execute a resource-related request. The NFVO 3011 may further send configuration information to the VNFM 3012 to collect status information of the VNF 303. In addition, the NFVO 3011 may further communicate with the VIM 3013 to perform resource allocation and/or reservation, and exchange virtual hardware resource configuration and status information. The VNFM 3012 may be configured to manage a life cycle of one or more VNFs, for example, instantiating (instantiating) the VNF 303, updating (updating) the VNF 303, querying the VNF 303, scaling (scaling) the VNF 303, and terminating (terminating) the VNF 303. Further, the VNFM 3012 may communicate with the VNF 303 to complete VNF life cycle management and exchange configurations and status information. In the NFV system, there may be a plurality of VNFMs. Different VNFMs can manage the life cycles of different types of VNFs. The VIM 3013 may control and manage interaction between the VNF 303 and a computing hardware 3024, a storage hardware 3025, a network hardware 3026, a virtual computing (virtual computing) 3021, a virtual storage 3022, and a virtual network 3023. For example, the VIM 3013 may perform a resource management function, including management of an infrastructure resource, allocation (for example, adding a resource to a virtual container), and running a function (for example, collecting NFVI fault information). The VNFM 3012 and the VIM 3013 may communicate with each other to request resource allocation, exchange virtualized hardware resource configurations and status information, and the like.

The NFVI 302 in FIG. 3 includes a hardware resource layer, a virtualization layer (virtualization layer), and a virtual resource layer. A hardware resource, a software resource, or a combination of the hardware resource and the software resource of the NFVI 302 completes deployment of a virtualized environment. In other words, the hardware resource and the virtualization layer are configured to provide a virtualized resource, for example, used as a virtual machine and a virtual container in another form for the VNF 303. The hardware resource layer includes a computing (computing) hardware 3024, a storage hardware 3025, and a network hardware 3026. The computing hardware 3024 may be an existing hardware in a market and/or a user-customized hardware, configured to provide processing and computing resources. The storage hardware 3025 may be a storage capacity provided in a network or a storage capacity (a local memory in a server) residing on the storage hardware 3025. In an implementation, resources of the computing hardware 3024 and the storage hardware 3025 may be aggregated together. The network hardware 3026 may be a switch, a router, and/or any other network device that is configured to have a switching function. The network hardware 3026 may span a plurality of domains, and may include a plurality of networks interconnected by one or more transmission networks. The virtualization layer in the NFVI 302 may abstract a hardware resource from a physical layer and decouple the VNF 303, to provide a virtualized resource for the VNF 303. The virtual resource layer includes a virtual computing 3021, a virtual storage 3022, and a virtual network 3023. The virtual computing 3021 and the virtual storage 3022 may be provided for the VNF 303 in a form of a virtual machine and/or another virtual container. For example, one or more VNFs 303 may be deployed on one virtual machine (virtual machine, VM). The virtualization layer abstracts the network hardware 3026 to form the virtual network 3023. The virtual network 3023 may include a virtual switch (virtual switch), and the virtual switch is configured to provide a connection between the virtual machine and another virtual machine.

In terms of hardware, the computing hardware 3024, the storage hardware 3025, and the network hardware 3026 may include a plurality of frames, a plurality of racks, or even a plurality of equipment rooms. In terms of software, there may be one VIM 3013 or a plurality of VIMs that separately manage different hardware resources.

The EM 304 is a system that is in a telecommunication system of some approaches and that is configured to configure and manage a network element. In the NFV system, the EM 304 may also be configured to configure and manage the VNF, and initiate a life cycle management operation such as instantiation of a new VNF to the VNFM.

The OSS/BSS 305 supports various end-to-end telecommunication services. A management function supported by the OSS includes network configuration, service provision, fault management, or the like. The BSS may be configured to process orders, pay fees, and generate revenue, and supports product management, order management, revenue management, and customer management.

The NFV system 30 shown in FIG. 3 is merely used as an example, and is not intended to limit the technical solutions of this application. A person skilled in the art should understand that, in a specific implementation process, the NFV system 30 may further include another network element, and a quantity of network elements may be determined based on a specific requirement. This is not limited.

In some embodiments, each network element in FIG. 3 in this embodiment of this application, for example, the NFVO 3011, the VIM 3013, or the OSS/BSS 305, may be a functional module in an apparatus. It may be understood that the functional module may be an element in a hardware device, a software functional module running on hardware, or a virtualized function instantiated on a platform (for example, a cloud platform).

Figures 4, 5:
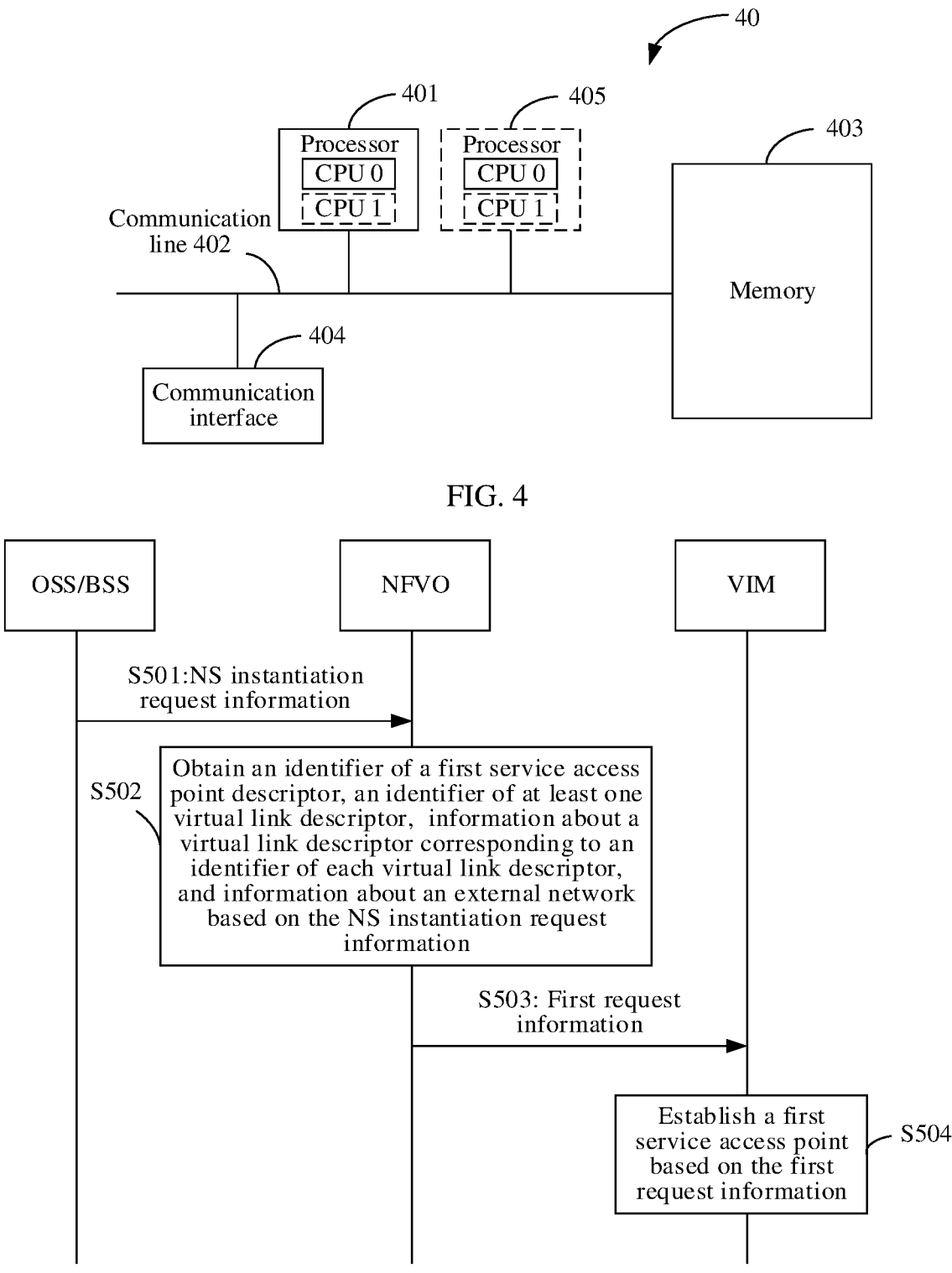
FIG. 4 is a schematic diagram of a hardware structure of a communication apparatus according to an embodiment of this application.
FIG. 5 is a schematic flowchart 1 of a method for establishing a network connection according to an embodiment of this application.

For example, each network element in FIG. 3 may be implemented by using a communication apparatus 40 in FIG. 4. FIG. 4 is a schematic diagram of a hardware structure of a communication apparatus applicable to an embodiment of this application. The communication apparatus 40 includes at least one processor 401 and at least one communication interface 404, configured to implement the method provided in this embodiment of this application. The communication apparatus 40 may further include a communication line 402 and a memory 403.

The processor 401 may be a general-purpose central processing unit (central processing unit, CPU), a microprocessor, an application-specific integrated circuit (application-specific integrated circuit, ASIC), or one or more integrated circuits configured to control program execution of the solutions in this application.

The communication line 402 may include a path such as a bus for transmitting information between the foregoing components.

The communication interface 404 is configured to communicate with another device or a communication network. The communication interface 404 may be any apparatus such as a transceiver, for example, may be an Ethernet interface, a radio access network (radio access network, RAN) interface, a wireless local area network (wireless local area networks, WLAN) interface, a transceiver, a pin, a bus, or a transceiver circuit.

The memory 403 may be a read-only memory (read-only memory, ROM) or another type of static storage device that can store static information and instructions, or a random access memory (random access memory, RAM) or another type of dynamic storage device that can store information and instructions. The memory 403 may alternatively be an electrically erasable programmable read-only memory (electrically erasable programmable read-only memory, EEPROM), a compact disc read-only memory (compact disc read-only memory, CD-ROM) or another compact disc storage, optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that is accessible by a computer, but is not limited thereto. The memory may exist independently, and is coupled to the processor 401 through the communication line 402. Alternatively, the memory 403 may be integrated with the processor 401. The memory provided in this embodiment of this application may be usually non-volatile. The memory 403 is configured to store computer-executable instructions for executing the solutions provided in this embodiment of this application, and the processor 401 controls execution of the computer-executable instructions. The processor 401 is configured to execute the computer-executable instructions stored in the memory 403, to implement the method provided in this embodiment of this application.

The computer-executable instructions in this embodiment of this application may alternatively be referred to as application program code. This is not specifically limited in this embodiment of this application.

The coupling in this embodiment of this application may be an indirect coupling or a communication connection between apparatuses, units, or modules in an electrical form, a mechanical form, or another form, and is used for information exchange between the apparatuses, the units, or the modules.

As an embodiment, the processor 401 may include one or more CPUs, for example, a CPU 0 and a CPU 1 in FIG. 4.

As an embodiment, the communication apparatus 40 may include a plurality of processors, for example, a processor 401 and a processor 405 in FIG. 4. Each of the processors may be a single-core (single-CPU) processor, or may be a multi-core (multi-CPU) processor. The processor herein may be one or more devices, circuits, and/or processing cores configured to process data (for example, computer program instructions).

The communication apparatus 40 may be a general-purpose device or a special-purpose device. In a specific implementation, the communication apparatus 40 may be a desktop computer, a network server, or a device having a structure similar to that in FIG. 4. A type of the communication apparatus 40 is not limited in this embodiment of this application.

With reference to FIG. 2, FIG. 3, and FIG. 4, the following describes in detail a method for establishing a network connection provided in embodiments of this application.

It should be noted that names of messages between network elements, names of parameters in the messages, or the like in the following embodiments of this application are merely examples, and there may be other names in a specific implementation. This is not specifically limited in embodiments of this application.

It should be noted that, in embodiments of this application, "/" may represent an "or" relationship between associated objects. For example, A/B may represent A or B. The term "and/or" may be used to describe three relationships between associated objects. For example, A and/or B may represent the following three cases: Only A exists, both A and B exist, and only B exists. A and B may be singular or plural.

To facilitate description of the technical solutions in embodiments of this application, in embodiments of this application, terms such as "first" and "second" may be used to distinguish between technical features with same or similar functions. The terms such as "first" and "second" do not limit a quantity and an execution sequence, and the terms such as "first" and "second" do not indicate a definite difference. In embodiments of this application, the term such as "example" or "for example" is used to represent an example, an illustration, or a description. Any embodiment or design scheme described with "example" or "for example" should not be explained as being more preferred or having more advantages than another embodiment or design scheme. Use of the term such as "example" or "for example" is intended to present a related concept in a specific manner for ease of understanding.

It should be noted that in embodiments of this application, for a technical feature, "first", "second", "third", "A", "B", "C", and "D" are used to distinguish technical features in the technical feature, and there is no chronological order or no size order between the technical features described by "first", "second", "third", "A", "B", "C", and "D".

It may be understood that a same step or steps or technical features having a same function in embodiments of this application may be mutually referenced in different embodiments.

It may be understood that in embodiments of this application, the NFVO, and/or the VIM, and/or the OSS/BSS may perform some or all of the steps in embodiments of this application. These steps are merely examples. In embodiments of this application, other steps or variations of various steps may be further performed. In addition, the steps may be performed in a sequence different from a sequence presented in embodiments of this application, and not all the steps in embodiments of this application need to be performed.

In embodiments of this application, a specific structure of an execution body of the method for establishing a network connection is not particularly limited in embodiments of this application, provided that the method provided in embodiments of this application can be implemented. For example, the method for establishing a network connection provided in embodiments of this application may be performed by an NFVO, or a component applied to the NFVO, for example, a chip. This is not limited in this application. Alternatively, the method for establishing a network connection provided in embodiments of this application may be performed by a VIM, or a component applied to the VIM, for example, a chip. This is not limited in this application. Alternatively, the method for establishing a network connection provided in embodiments of this application may be performed by an OSS/BSS, or a component applied to the OSS/BSS, for example, a chip. This is not limited in this application. The following embodiments are described by using an example in which execution bodies of the method for establishing a network connection are respectively an NFVO, a VIM, and an OSS/BSS.

FIG. 5 is a method for establishing a network connection according to an embodiment of this application. The method for establishing a network connection includes S501 to S504.

S501: An OSS/BSS sends NS instantiation request information to an NFVO.

The OSS/BSS may be the OSS/BSS 305 in FIG. 3. The NFVO may be the NFVO 3011 in FIG. 3.

In embodiments of this application, the NS instantiation request information may be for requesting to instantiate an NS. The NS instantiation request information may also be referred to as an NS instantiation request, a request for instantiating an NS, or the like. This is not limited.

For example, the network system 20 shown in FIG. 2 is used as an example. An OSS/BSS corresponding to the data center 201 may send NS instantiation request information 1 to an NFVO corresponding to the data center 201, and an OSS/BSS corresponding to the data center 206 may send NS instantiation request information 2 to an NFVO corresponding to the data center 206. The NS instantiation request information 1 is for requesting to instantiate the NS 202. The NS instantiation request information 2 is for requesting to instantiate the NS 209.

In embodiments of this application, content included in the NS instantiation request information may include but is not limited to the following three cases.

Case 1: The NS Instantiation Request Information Includes an Identifier of an NS Instance.

In embodiments of this application, the identifier of the NS instance may identify the NS instance.

Further, the NS instantiation request information further includes information about a transmission network.

In embodiments of this application, the information about the transmission network may include an identifier of a first service access point descriptor, an identifier of a connectivity service endpoint, and an identifier of a second network. The information about the transmission network may also be referred to as WAN information, wide area network information, WAN connection data (WANConnectionData), or the like, which is not limited.

In embodiments of this application, the identifier of the first service access point descriptor may identify the first service access point descriptor. The first service access point descriptor may also be referred to as a first SAPD (service access point descriptor). The first service access point descriptor may indicate a requirement for creating a first service access point. The first service access point may be the service access point 2021, the service access point 2031, the service access point 2081, or the service access point 2091 in FIG. 2. In some embodiments, the service access point is a router (router) resource. That is, the service access point has a routing function.

In embodiments of this application, the identifier of the connectivity service endpoint may identify the connectivity service endpoint. The connectivity service endpoint may be configured to connect a data center and a universal transmission network that are managed by a VIM. The VIM may be the VIM 3013 in FIG. 3.

For example, if the first service access point is the service access point 2081 or the service access point 2091 in FIG. 2, the connectivity service endpoint may be the connectivity service endpoint 207 in FIG. 2, and the connectivity service endpoint 207 may be configured to connect the data center 206 and the universal transmission network 205. If the first service access point is the service access point 2021 or the service access point 2031 in FIG. 2, the connectivity service endpoint may be the connectivity service endpoint 204 in FIG. 2, and the connectivity service endpoint 204 may be configured to connect the data center 201 and the universal transmission network 205.

In some embodiments, the connectivity service endpoint is a data center gate way. The network system 20 shown in FIG. 2 is used as an example. The connectivity service endpoint 204 is an external gate way of the data center 201, and the connectivity service endpoint 207 is an external gate way of the data center 206.

In embodiments of this application, the identifier of the second network may be used by the connectivity service endpoint to access the universal transmission network. In other words, the second network is a network adjacent to the connectivity service endpoint in the universal transmission network.

In some embodiments, content included in the information about the transmission network may be shown in Table 1. In Table 1, the information about the transmission network includes related information of the first access point, the identifier of the descriptor, and protocol data (protocol-Data) information. The related information of the first service access point includes the identifier of the first service access point descriptor. A type of the identifier of the first service access point descriptor is a string (string). A type of the protocol data information is WAN connection protocol data (WANConnectionProtocolData). The WAN connection protocol data includes connectivity service endpoint information (ConnectivityServiceEndpointInfo), and the connectivity service endpoint information includes an identifier of a connectivity service endpoint (connectivityServiceEndpointId). Further, the connectivity service endpoint information further includes site to WAN layer 2 protocol data (SiteToWANLayer2ProtocolData). In the site to WAN layer 2 protocol data, an interface connecting the connectivity service endpoint to the universal transmission network is the second network.

TABLE 1

| Parameter | Quantity | Type |
|---|---|---|
| Related information of the first service access point | 1 | |
| >Identifier of the first service access point descriptor | 1 | string |
| protocolData | | WANConnectionProtocolData |
| . . . | | |

It may be understood that Table 1 is merely an example of the information about the transmission network. In a specific application, the information about the transmission network may further include more or less information than that in Table 1. This is not limited.

Case 2: The NS Instantiation Request Information Includes an Identifier of an NS Instance and Information about an External Network.

For a description of the identifier of the NS instance, refer to the foregoing case 1.

In embodiments of this application, the information about the external network includes an identifier of a first network and an identifier of a connectivity service endpoint. The information about the external network may also be referred to as information about a network externally connected to the first service access point, information about external-Network, or the like, which is not limited.

The identifier of the first network may identify the first network. The first network may be configured to connect the first service access point to a connectivity service endpoint, and the first network may also be referred to as an external network (external network). Further, the first network is a deployed network or an undeployed network. For descriptions of the first service access point and the connectivity service endpoint, refer to the description in the foregoing case 1.

For example, the network system 20 shown in FIG. 2 is used as an example. If the first service access point is the service access point 2021 in FIG. 2, and the connectivity service endpoint is the connectivity service endpoint 204 in FIG. 2, the first network may be the external network 210 in FIG. 2.

In some embodiments, the information about the external network is included in the information about the first service access point. The information about the first service access point may also be referred to as first SapData.

In some embodiments, content included in the information about the external network may be shown in Table 2. In Table 2, the information about the external network includes externalNetwork, and a type of the externalNetwork is external network data (externalNetworkdata). If a quantity of externalNetworks is 0, it may indicate that the NS instantiation request information does not include the information about the external network.

TABLE 2

| Parameter | Quantity | Type |
|---|---|---|
| externalNetwork | 0 or 1 | externalNetworkdata |
| . . . | | |

It may be understood that, Table 2 is merely an example of the information about the external network. In a specific application, the information about the external network may further include more information than that in Table 2. This is not limited.

Further, parameters included in the externalNetworkdata may be shown in Table 3. In Table 3, a segmentation identifier (segmentationID) is an identifier of the undeployed network, that is, an identifier of a network that needs to be newly established. A quantity of segmentation identifiers is 0 or 1, and a type of the segmentation identifier is a string. A quantity of identifiers of the connectivity service endpoint is 0 or 1, and a type of the identifier of the connectivity service endpoint is a string. A network name (networkName) is an identifier of the deployed network. A quantity of network names is 0 or 1, and a type of the network name is a string. It should be noted that in the externalNetworkdata, the segmentation identifier and the network name do not exist at the same time. That is, the externalNetworkdata includes the segmentation identifier and the identifier of the connectivity service endpoint, or the externalNetworkdata includes the network name and the identifier of the connectivity service endpoint.

TABLE 3

| Parameter | Quantity | Type |
|---|---|---|
| segmentationID | 0 or 1 | string |
| connectivityServiceEndpointId | 0 or 1 | string |
| networkName | 0 or 1 | string |

It may be understood that Table 3 is merely an example of the parameters included in the externalNetworkdata. In a specific application, the externalNetworkdata may further include more or fewer parameters than those in Table 3. This is not limited.

Case 3: The NS Instantiation Request Information Includes an Identifier of an NS Instance, Information about an External Network, and Information about a Transmission Network.

For descriptions of the identifier of the NS instance and the information about the transmission network, refer to the foregoing case 1. For a description of the information about the external network, refer to the description in the foregoing case 2.

In some embodiments, when the NS has a cross-domain (for example, a data center) connection establishment requirement, the OSS/BSS sends the NS instantiation request information to the NFVO.

For example, the network system 20 shown in FIG. 2 is used as an example. If the NS 202 needs to establish a connection with the NS 209, an OSS/BSS corresponding to the data center 201 sends NS instantiation request information 1 to an NFVO corresponding to the data center 201, and an OSS/BSS corresponding to the data center 206 sends NS instantiation request information 2 to an NFVO corresponding to the data center 206. The NS instantiation request information 1 is for requesting to instantiate the NS 202. The NS instantiation request information 2 is for requesting to instantiate the NS 209. Similarly, if the NS 208 needs to establish a connection with the NS 203, the OSS/BSS corresponding to the data center 206 sends an NS instantiation request 3 to the NFVO corresponding to the data center 206, and the OSS/BSS corresponding to the data center 201 sends an NS instantiation request 4 to the NFVO corresponding to the data center 201. The NS instantiation request information 3 is for requesting to instantiate the NS 208. The NS instantiation request information 4 is for requesting to instantiate the NS 203.

Correspondingly, the NFVO receives the NS instantiation request information from the OSS/BSS.

S502: The NFVO obtains an identifier of a first service access point descriptor, an identifier of at least one virtual link descriptor, information about a virtual link descriptor corresponding to an identifier of each virtual link descriptor, and information about an external network based on the NS instantiation request information.

In embodiments of this application, the identifier of the virtual link descriptor corresponds to the identifier of the first service access point descriptor. The identifier of the virtual link descriptor may identify the virtual link descriptor (virtual link descriptor, VLD). The virtual link descriptor may indicate a requirement for creating a virtual link connected to the first service access point. For example, the network system 20 shown in FIG. 2 is used as an example, and a virtual link descriptor corresponding to the service access point 2021 may indicate a requirement for creating a virtual link 2024 and a virtual link 2025 that are connected to the service access point 2021.

In embodiments of this application, the information about the virtual link descriptor may indicate the virtual link descriptor, that is, may indicate a requirement for creating a virtual link connected to the first service access point.

In some embodiments, before S501, the NFVO receives a network service descriptor (network service descriptor, NSD) file from the OSS/BSS, so that after receiving the NS instantiation request information, the NFVO obtains the identifier of the first service access point descriptor, the identifier of the at least one virtual link descriptor, the information about the virtual link descriptor corresponding to the identifier of each virtual link descriptor, and the information about the external network based on the NS instantiation request information and the NSD file.

Further, for the foregoing case 1, case 2, and case 3, the NSD file includes different content, and the following provides detailed descriptions.

For the foregoing case 1, the NSD file includes information about the first service access point descriptor and the information about the virtual link descriptor.

The information about the first service access point descriptor may include the identifier of the first service access point descriptor, the identifier of the at least one virtual link descriptor, and the information about the external network. The information about the first service access point descriptor may also be referred to as information about a first sapd. The information about the external network may be specified in a design state. For a description of the information about the external network, refer to the foregoing case 2.

In this case, that the NFVO obtains an identifier of a first service access point descriptor, an identifier of at least one virtual link descriptor, and information about a virtual link descriptor corresponding to an identifier of each virtual link descriptor, and information about an external network based on the NS instantiation request information includes: The NFVO obtains an NSD file corresponding to the identifier of the NS instance. In this way, the NFVO may obtain the identifier of the first service access point descriptor, the identifier of the at least one virtual link descriptor, and the information about the virtual link descriptor corresponding to the identifier of each virtual link descriptor, and the information about the external network from the NSD file.

For the foregoing case 2 and case 3, the NSD file includes information about the first service access point descriptor and the information about the virtual link descriptor.

The information about the first service access point descriptor may include the identifier of the first service access point descriptor and the identifier of the at least one virtual link descriptor.

In this case, that the NFVO obtains an identifier of a first service access point descriptor, an identifier of at least one virtual link descriptor, information about a virtual link descriptor corresponding to an identifier of each virtual link descriptor, and information about an external network based on the NS instantiation request information includes: The NFVO obtains, based on the NS instantiation request information, the information about the external network and an NSD file corresponding to the identifier of the NS instance. In this way, the NFVO may obtain the information about the external network from the NS instantiation request information, and obtain, from the NSD file, the identifier of the first service access point descriptor, the identifier of the at least one virtual link descriptor, the information about the virtual link descriptor corresponding to the identifier of each virtual link descriptor.

It may be understood that, in embodiments of this application, the NSD file may further include an identifier of an NSD. After receiving the NSD file, the NFVO may further receive, from the OSS/BSS, a request for creating the identifier of the NS instance. The request for creating the identifier of the NS instance includes the identifier of the NSD. After receiving the request for creating the identifier of the NS instance, the NFVO sends the identifier of the NS instance to the OSS/BSS. In this way, the NS instantiation request information sent by the OSS/BSS to the NFVO may include the identifier of the NS instance, so that the NFVO obtains the NSD file based on the identifier of the NS instance.

S503: The NFVO sends first request information to a VIM.

In some embodiments, before S503, the NFVO sends a request for creating a virtual link instance to the VIM, so that the VIM establishes a virtual link based on the request for creating a virtual link instance. The request for creating a virtual link instance may be for establishing a virtual link. For example, the network system 20 shown in FIG. 2 is used as an example, the request for creating a virtual link instance may be for establishing the virtual link 2024 and the virtual link 2025.

Further, the request for creating a virtual link instance includes the information about the virtual link descriptor.

In embodiments of this application, the first request information may be for establishing a first service access point. The first service access point may be configured to connect to a connectivity service endpoint via a first network, and configured to connect to a virtual link corresponding to an identifier of at least one virtual link descriptor.

For example, the network system 20 shown in FIG. 2 is used as an example. The service access point 2021 may be configured to connect to the connectivity service endpoint

204 via the external network 210, and the service access point 2021 may further connect the virtual link 2024 and the virtual link 2025.

In some embodiments, the first request information includes information about an external network and information about a virtual link instance. The information about the virtual link instance may include an identifier of a virtual link corresponding to an identifier of at least one virtual link descriptor.

Correspondingly, the VIM receives the first request information from the NFVO.

S504: The VIM establishes a first service access point based on the first request information.

In some embodiments, that the VIM establishes a first service access point based on the first request information includes: The VIM establishes, based on the first request information, a connection between the first service access point and the connectivity service endpoint via the first network, and establishes a connection between the first service access point and the virtual link corresponding to the identifier of the at least one virtual link description descriptor.

For example, the network system 20 shown in FIG. 2 is used as an example. If the first request information includes the information about the external network and the information about the virtual link instance, the information about the external network includes an identifier of the external network 210 and an identifier of the connectivity service endpoint 204, and the information about the virtual link instance includes an identifier of the virtual link 2024 and an identifier of the virtual link 2025, the VIM creates the service access point 2021, configured to connect the virtual link 2024 and the virtual link 2025, and then creates the external network 210 from the service access point 2021 to the connectivity service endpoint 204.

In some embodiments, after establishing the first service access point, the VIM sends a first establishment complete message to the NFVO, to notify the NFVO that the first service access point is established. Subsequently, after receiving the first establishment complete message, the NFVO may send a second establishment complete message to the OSS/BSS, to notify the OSS/BSS that the first service access point is established.

In some embodiments, after S504, the NFVO interacts with a VNFM to create a VNF, and the following step A to step C may be specifically included.

Step A: The NFVO Sends a VNF Instance Identifier Creation Request to the VNFM.

The VNFM may be the VNFM 3012 in FIG. 3.

In embodiments of this application, the VNF instance identifier creation request may be for requesting to create an instance identifier of the VNF.

It may be understood that, in embodiments of this application, the NSD file may further include information about a VNF descriptor (VNF descriptor, VNFD). The information about the VNFD may indicate the VNFD, that is, may indicate a requirement for creating the VNF. Further, the information about the VNFD includes an identifier of the VNFD and the VNFD. In this case, the request for creating a VNF instance identifier may include the identifier of the VNFD.

Correspondingly, the VNFM receives the VNF instance identifier creation request from the NFVO.

After receiving the VNF instance identifier creation request, the VNFM creates the instance identifier of the VNF. The VNFM may further establish a binding relationship between the instance identifier of the VNF and the identifier of the VNFD.

Step B: The NFVO Receives a VNF Instance Identifier Creation Response from the VNFM.

The VNF instance identifier creation response includes the instance identifier of the VNF. Further, the VNF instance identifier creation response further includes creation success information.

Step C: The NFVO Sends a VNF Instantiation Request to the VNFM.

The VNF instantiation request may be for requesting to create the VNF. In some embodiments, the VNF instantiation request includes the instance identifier of the VNF.

Correspondingly, the VNFM receives the VNF instantiation request from the NFVO.

In some embodiments, after receiving the VNF instantiation request from the NFVO, the VNFM obtains the identifier of the VNFD based on the instance identifier of the VNF, and obtains the VNFD. Subsequently, the VNFM may create the VNF based on the VNFD.

It may be understood that, after the first service access point and the VNF corresponding to the first service access point are established, the first service access point may forward data from the VNF to the connectivity service endpoint, and forward data from the connectivity service endpoint to the corresponding VNF. For example, in the network system 20 shown in FIG. 2, the service access point 2021 may forward data from the VNF 2022 to the connectivity service endpoint 204, and forward data from the connectivity service endpoint 204 to the VNF 2022. The first service access point may further forward data from the VNF to another service access point in the data center, and forward data from the another service access point to the corresponding VNF. For example, in the network system 20 shown in FIG. 2, the service access point 2021 may forward data from the VNF 2023 to the service access point 2031, and forward data from the service access point 2031 to the VNF 2023.

In some embodiments, after creating the VNF, the VNFM sends a third establishment complete message to the NFVO, to notify the NFVO that the VNF is created. Subsequently, after receiving the third establishment complete message, the NFVO may send a fourth establishment complete message to the OSS/BSS, to notify the OSS/BSS that the VNF is created.

Based on the method shown in FIG. 5, a first service access point may be established, so that the first service access point is connected to a connectivity service endpoint via a first network, and the first service access point is connected to a VNF by using a corresponding virtual link, thereby implementing a connection between the VNF and the connectivity service endpoint, for example, a DC GW.

The actions of the OSS/BSS, the NFVO, or the VIM in S501 to S504 may be performed by a processor 401 in a communication apparatus 40 shown in FIG. 4 by invoking an application program code stored in a memory 403. This is not limited in this embodiment.

Further, in some embodiments of the method shown in FIG. 5, for the foregoing Case 1 and Case 3, if the NS instantiation request information includes the information about the transmission network, the NFVO may send a second request information to the VIM, so that the VIM sends the second request information to the connectivity service endpoint. In this way, after the connectivity service endpoint receives the second request information, the connectivity service endpoint may be set based on the second request, so that an interface connecting the connectivity service endpoint to the universal transmission network is a second network, and there is a mapping relationship between the identifier of the second network and the identifier of the first network. Specifically, refer to the method shown in FIG. 6. The method shown in FIG. 5 may further include S601 to S603.

S601. An NFVO sends second request information to a VIM.

In this embodiment of this application, the second request information may be for requesting to set an interface connecting the connectivity service endpoint to the universal transmission network as a second network, and is for mapping an identifier of the second network to an identifier of the first network on the connectivity service endpoint.

In some embodiments, the second request information includes an identifier of the second network and an identifier of the first network. Further, the second request information further includes an identifier of the connectivity service endpoint.

Correspondingly, the VIM receives the second request information from the NFVO.

S602: The VIM sends the second request information to a connectivity service endpoint.

In a case, after the VIM receives the second request information, the second request information is directly sent to the connectivity service endpoint. In other words, the NFVO transparently transmits the second request information to the connectivity service endpoint by using the VIM. In another case, after the VIM receives the second request information, the second request information is included in one piece of information, for example, included in a first configuration information and sent to the connectivity service endpoint.

Correspondingly, the connectivity service endpoint receives the second request information from the VIM.

S603: The connectivity service endpoint sets a connection interface between the connectivity service endpoint and a universal transmission network as a second network based on the second request information, and maps an identifier of the second network to an identifier of a first network on the connectivity service endpoint.

For example, the network system 20 shown in FIG. 2 is used as an example. After the connectivity service endpoint 204 receives the second request information, the connection interface between the connectivity service endpoint 204 and the universal transmission network 205 may be set as the second network, and the identifier of the second network is mapped to the identifier of the first network on the connectivity service endpoint 204.

It may be understood that, after the foregoing setting is performed on the connectivity service endpoint, the connectivity service endpoint may forward data from the first network to the second network, and forward data from the second network to the first network. In this way, the data center is connected to the universal transmission network through the connectivity service endpoint.

In some embodiments, after the setting of the connectivity service endpoint is completed, a first configuration complete message is sent to the VIM, to notify the VIM that the setting of the connectivity service endpoint is completed. Subsequently, after the VIM receives the first configuration complete message, a second configuration complete message may be sent to the NFVO, to notify the NFVO that the setting of the connectivity service endpoint is completed. After the NFVO receives the second configuration complete message, a third configuration complete message may be sent to the OSS/BSS, to notify the OSS/BSS that the setting of the connectivity service endpoint is completed.

Figure 6:
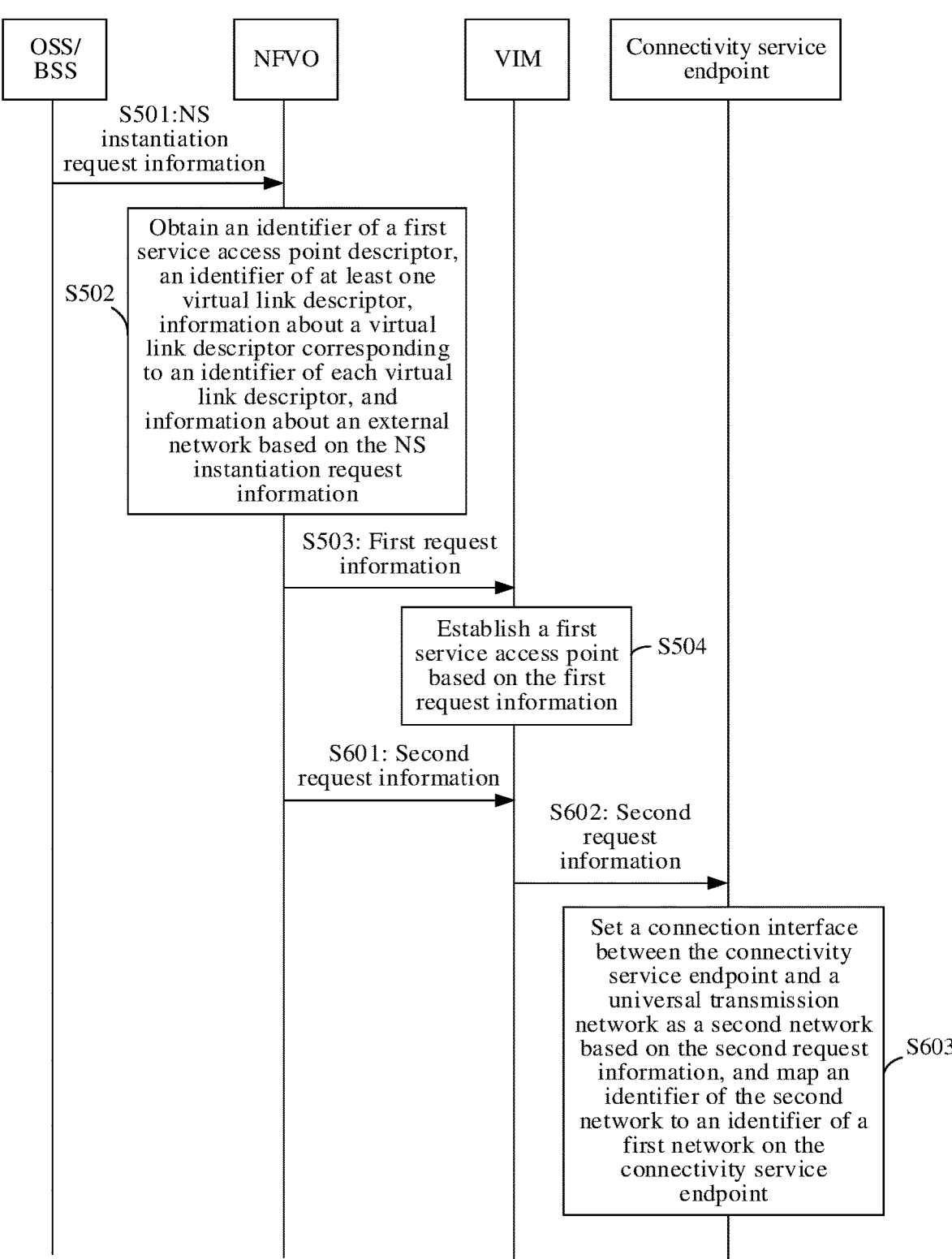
FIG. 6 is a schematic flowchart 2 of a method for establishing a network connection according to an embodiment of this application.

Based on the method shown in FIG. 6, a connectivity service endpoint may be set, so that an interface connecting the connectivity service endpoint to the universal transmission network is a second network, and an identifier of the second network has a mapping relationship with an identifier of the first network. In this way, the data center is connected to the universal transmission network through the connectivity service endpoint. In addition, if the network is set by using the method shown in FIG. 6, whether the universal transmission network or a network of another data center is successfully established may not be concerned. In other words, even if the universal transmission network or the network of another data center is not established, the first service access point may be established by using the method shown in FIG. 6, and the connectivity service endpoint may be set. Subsequently, after the universal transmission network or the network of another data center is established, the network may be connected to the connectivity service endpoint, thereby simplifying a cross-domain network connection process.

The actions of the NFVO or the VIM in S601 to S603 may be performed by the processor 401 in the communication apparatus 40 shown in FIG. 4 by invoking the application program code stored in the memory 403. This is not limited in this embodiment.

In some embodiments of the method shown in FIG. 5, for the foregoing Case 2, the OSS/BSS sends the information about the transmission network to the NFVO, and after the NFVO receives the information about the transmission network, the second request information may be sent to the VIM, so that the VIM sends the second request information to the connectivity service endpoint. In this way, after the connectivity service endpoint receives the second request information, the connectivity service endpoint may be set based on the second request, so that an interface connecting the connectivity service endpoint to the universal transmission network is a second network, and there is a mapping relationship between the identifier of the second network and the identifier of the first network. Specifically, refer to the method shown in FIG. 7. The method shown in FIG. 5 may further include S701 to S704.

S701: An OSS/BSS sends information about a transmission network to an NFVO.

In some embodiments, after the OSS/BSS obtains the information about the transmission network, the information about the transmission network is sent to the VFVO. For example, in a slicing scenario, the OSS/BSS may obtain the information about the transmission network from a slice manager, and send the information about the transmission network to the VFVO. For another example, after an operator determines the information about the transmission network, and inputs the information about the transmission network into the OSS/BSS, the OSS/BSS sends the information about the transmission network to the VFVO.

In some embodiments, the information about the transmission network is included in an NS instantiation update request. The NS instantiation update request may be configured to request to update related information about NS instantiation. The NS instantiation update request may also be referred to as a request for updating NS instantiation, a request for updating information about NS instantiation, or the like.

Correspondingly, the NFVO receives the information about the transmission network from the OSS/BSS.

S702. The NFVO sends second request information to a VIM.

S703: The VIM sends the second request information to a connectivity service endpoint.

S704: The connectivity service endpoint sets a connection interface between the connectivity service endpoint and a universal transmission network as a second network based on the second request information, and maps an identifier of the second network to an identifier of a first network on the connectivity service endpoint.

For a specific process of S702 to S704, refer to corresponding descriptions in S601 to S603. Details are not described again.

Figure 7:
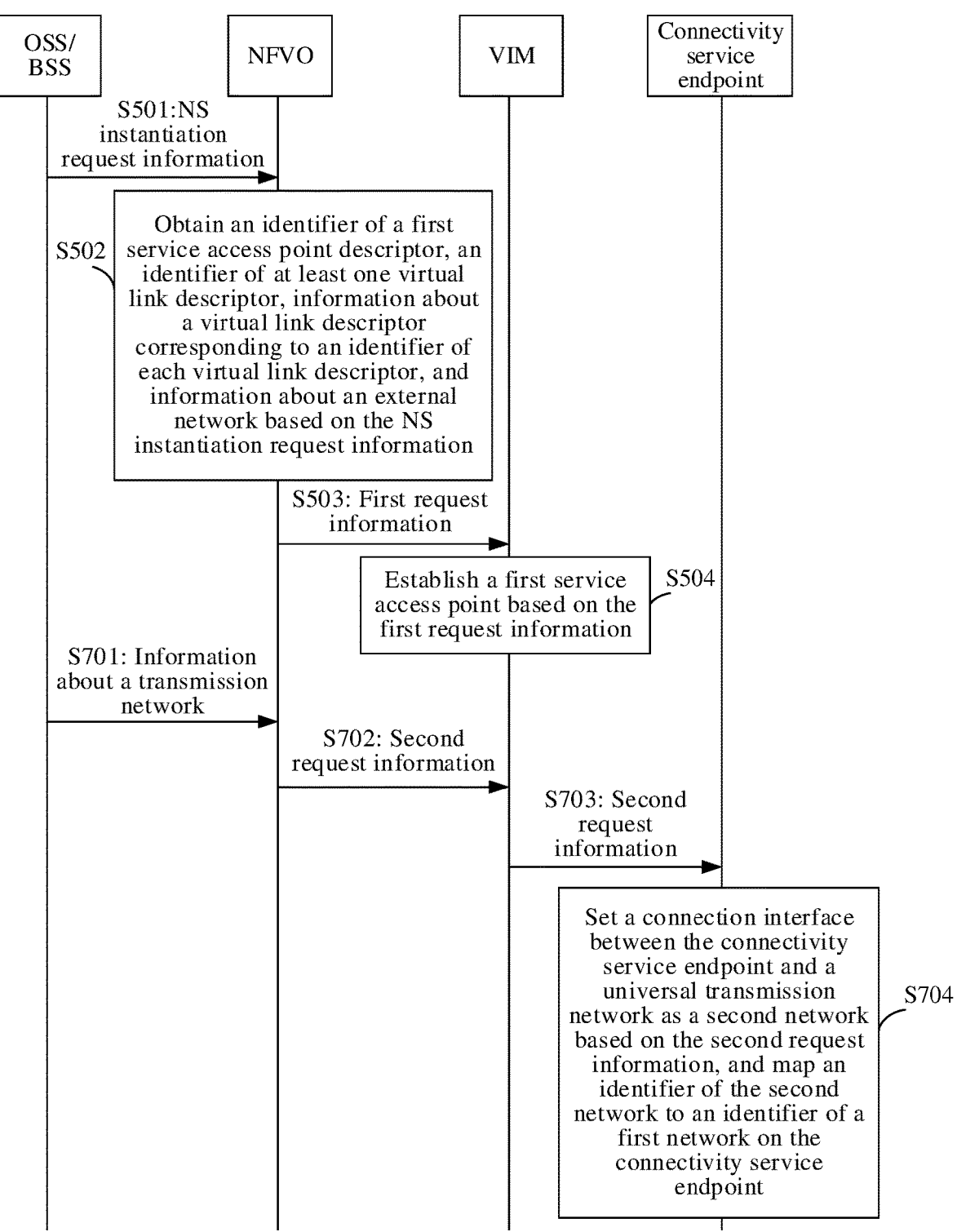
FIG. 7 is a schematic flowchart 3 of a method for establishing a network connection according to an embodiment of this application.

Based on the method shown in FIG. 7, when the NS instantiation request information does not include the information about the transmission network, the OSS/BSS may send the information about the transmission network to the NFVO after the NS instantiation request information is sent. After the NFVO receives the information about the transmission network, the NFVO may send the second request information to the connectivity service endpoint by using the VIM, so as to set the connectivity service endpoint, so that an interface connecting the connectivity service endpoint to the universal transmission network is the second network, and there is a mapping relationship between an identifier of the second network and an identifier of the first network. In this way, the data center is connected to the universal transmission network through the connectivity service endpoint. In addition, if the network is set by using the method shown in FIG. 7, whether the universal transmission network or a network of another data center is successfully established may not be concerned. In other words, even if the universal transmission network or the network of another data center is not established, the first service access point may be established by using the method shown in FIG. 7, and the connectivity service endpoint may be set. Subsequently, after the universal transmission network or the network of another data center is established, the network may be connected to the connectivity service endpoint, thereby simplifying a cross-domain network connection process.

The actions of the OSS/BSS, the NFVO, or the VIM in S701 to S704 may be performed by the processor 401 in the communication apparatus 40 shown in FIG. 4 by invoking the application program code stored in the memory 403. This is not limited in this embodiment.

The foregoing mainly describes the solutions provided in embodiments of this application from a perspective of interaction between network elements. It may be understood that, to implement the foregoing functions, the NFVO, the VIM, the OSS/BSS, or the like includes corresponding hardware structures and/or software modules for performing the functions. A person skilled in the art should be easily aware that, in combination with units and algorithm operations of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional module division may be performed on the NFVO, the VIM, the OSS/BSS, or the like based on the foregoing method examples. For example, each functional module may be divided based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 8:
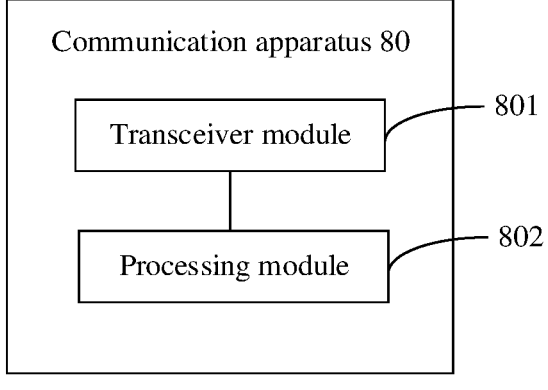
FIG. 8 is a schematic diagram of a structure of a communication apparatus according to an embodiment of this application.

For example, when each functional module is obtained through division in an integrated manner, FIG. 8 is a schematic diagram of a structure of a communication apparatus 80. A communication apparatus 80 includes a transceiver module 801 and a processing module 802.

For example, the communication apparatus 80 is configured to implement a function of the NFVO. The communication apparatus 80 is, for example, the NFVO in the embodiment shown in FIG. 5, the embodiment shown in FIG. 6, or the embodiment shown in FIG. 7.

In this embodiment of this application, the communication apparatus 80 may be an NFVO, or may be a chip applied to an NFVO, or another combined device or component that has a function of the foregoing NFVO, or the like. When the communication apparatus 80 is an NFVO, the transceiver module 801 may be a transceiver. The transceiver may include an antenna, a radio frequency circuit, and the like. The processing module 802 may be a processor (or a processing circuit), for example, a baseband processor. The baseband processor may include one or more CPUs. When the communication apparatus 80 is a component having a function of the foregoing NFVO, the transceiver module 801 may be a radio frequency unit, and the processing module 802 may be a processor (or a processing circuit), for example, a baseband processor. When the communication apparatus 80 is a chip system, the transceiver module 801 may be an input/output interface of a chip (for example, a baseband chip), and the processing module 802 may be a processor (or a processing circuit) of the chip system, and may include one or more CPUs. It should be understood that the transceiver module 801 in this embodiment of this application may be implemented by a transceiver or a transceiver-related circuit component, and the processing module 802 may be implemented by a processor or a processor-related circuit component (or referred to as a processing circuit).

For example, the transceiver module 801 may be configured to perform all sending and/or receiving operations performed by the NFVO in the embodiment shown in FIG. 5, for example, S501 and S503, and/or configured to support another process of the technology described in this specification. The processing module 802 may be configured to perform all operations performed by the NFVO in the embodiment shown in FIG. 5 except sending and/or receiving operations, for example, S502, and/or configured to support another process of the technology described in this specification.

For another example, the transceiver module 801 may be configured to perform all sending and/or receiving operations performed by the NFVO in the embodiment shown in FIG. 6, for example, S501, S503, and S601, and/or configured to support another process of the technology described in this specification. The processing module 802 may be configured to perform all operations performed by the NFVO in the embodiment shown in FIG. 6 except sending and/or receiving operations, for example, S502, and/or configured to support another process of the technology described in this specification.

For another example, the transceiver module 801 may be configured to perform all sending and/or receiving operations performed by the NFVO in the embodiment shown in FIG. 7, for example, S501, S503, S701, and S702, and/or configured to support another process of the technology described in this specification. The processing module 802 may be configured to perform all operations performed by the NFVO in the embodiment shown in FIG. 7 except sending and/or receiving operations, for example, S502, and/or configured to support another process of the technology described in this specification.

The transceiver module 801 is configured to receive NS instantiation request information from an OSS/BSS.

The processing module 802 is configured to obtain an identifier of a first service access point descriptor, an identifier of at least one virtual link descriptor, information about a virtual link descriptor corresponding to an identifier of each virtual link descriptor, and information about an external network based on the NS instantiation request information, where the information about the virtual link descriptor indicates a requirement for creating a virtual link connected to a first service access point, the information about the external network includes an identifier of a first network and an identifier of a connectivity service endpoint, the first network is configured to connect the first service access point to the connectivity service endpoint, and the connectivity service endpoint is configured to connect a data center and a universal transmission network that are managed by a VIM.

The transceiver module 801 is further configured to send first request information to the VIM, where the first request information is for requesting to establish the first service access point, and the first service access point is configured to connect to the connectivity service endpoint via the first network, and is configured to connect to a virtual link corresponding to the identifier of the at least one virtual link descriptor.

In some embodiments, the NS instantiation request information includes an identifier of an NS instance and the information about the external network. The processing module 802 is specifically configured to obtain, based on the NS instantiation request information, the information about the external network and a network service descriptor NSD file corresponding to the identifier of the NS instance, where the NSD file includes information about the first service access point descriptor and the information about the virtual link descriptor, and the information about the first service access point descriptor includes the identifier of the first service access point descriptor and the identifier of the at least one virtual link descriptor.

In some embodiments, the NS instantiation request information further includes information about a transmission network, the information about the transmission network includes the identifier of the first service access point descriptor, the identifier of the connectivity service endpoint, and an identifier of a second network, and the identifier of the second network is used by the connectivity service endpoint to access the universal transmission network.

In some embodiments, the transceiver module 801 is further configured to receive information about a transmission network from the OSS/BSS, where the information about the transmission network includes the identifier of the first service access point descriptor, the identifier of the connectivity service endpoint, and an identifier of a second network, and the identifier of the second network is used by the connectivity service endpoint to access the universal transmission network.

In some embodiments, the information about the transmission network is included in an NS instantiation update request.

In some embodiments, the NS instantiation request information includes an identifier of an NS instance; and the processing module 802 is specifically configured to obtain an NSD file corresponding to the identifier of the NS instance, where the NSD file includes information about the first service access point descriptor and the information about the virtual link descriptor, and the information about the first service access point descriptor includes the identifier of the first service access point descriptor, the identifier of the at least one virtual link descriptor, and the information about the external network.

In some embodiments, the NS instantiation request information further includes information about a transmission network, the information about the transmission network includes the identifier of the first service access point descriptor, the identifier of the connectivity service endpoint, and an identifier of a second network, and the identifier of the second network is used by the connectivity service endpoint to access the universal transmission network.

In some embodiments, the transceiver module 801 is further configured to send second request information to the VIM, where the second request information is for requesting to set an interface that connects the connectivity service endpoint to the universal transmission network as the second network, and is for mapping the identifier of the second network to the identifier of the first network on the connectivity service endpoint.

In some embodiments, the first network is a deployed network or an undeployed network.

When the communication apparatus 80 is configured to implement functions of the NFVO, for other functions that can be implemented by the communication apparatus 80, refer to related descriptions of the embodiment shown in FIG. 5, the method embodiment shown in FIG. 6, or the embodiment shown in FIG. 7. Details are not described again.

Alternatively, for example, the communication apparatus 80 is configured to implement a function of a VIM. The communication apparatus 80 is, for example, the VIM in the embodiment shown in FIG. 5, the embodiment shown in FIG. 6, or the embodiment shown in FIG. 7.

In this embodiment of this application, the communication apparatus 80 may be a VIM, or may be a chip applied to a VIM, or another combined device or component that has a function of the foregoing VIM, or the like. When the communication apparatus 80 is a VIM, the transceiver module 801 may be a transceiver. The transceiver may include an antenna, a radio frequency circuit, and the like. The processing module 802 may be a processor (or a processing circuit), for example, a baseband processor. The baseband processor may include one or more CPUs. When the communication apparatus 80 is a component having a function of the foregoing VIM, the transceiver module 801 may be a radio frequency unit, and the processing module 802 may be a processor (or a processing circuit), for example, a baseband processor. When the communication apparatus 80 is a chip system, the transceiver module 801 may be an input/output interface of a chip (for example, a baseband chip), and the processing module 802 may be a processor (or a processing circuit) of the chip system, and may include one or more CPUs. It should be understood that the transceiver module 801 in this embodiment of this application may be implemented by a transceiver or a transceiver-related circuit component, and the processing module 802 may be implemented by a processor or a processor-related circuit component (or referred to as a processing circuit).

For example, the transceiver module 801 may be configured to perform all sending and/or receiving operations performed by the VIM in the embodiment shown in FIG. 5, for example, S503, and/or configured to support another process of the technology described in this specification. The processing module 802 may be configured to perform all operations performed by the VIM in the embodiment shown in FIG. 5 except sending and/or receiving operations, for example, S504, and/or configured to support another process of the technology described in this specification.

For another example, the transceiver module 801 may be configured to perform all sending and/or receiving operations performed by the VIM in the embodiment shown in FIG. 6, for example, S503, S601, and S602, and/or configured to support another process of the technology described in this specification. The processing module 802 may be configured to perform all operations performed by the VIM in the embodiment shown in FIG. 6 except sending and/or receiving operations, for example, S504, and/or configured to support another process of the technology described in this specification.

For another example, the transceiver module 801 may be configured to perform all sending and/or receiving operations performed by the VIM in the embodiment shown in FIG. 7, for example, S503, S702, and S703, and/or configured to support another process of the technology described in this specification. The processing module 802 may be configured to perform all operations performed by the VIM in the embodiment shown in FIG. 7 except sending and/or receiving operations, for example, S504, and/or configured to support another process of the technology described in this specification.

The transceiver module 801 is configured to receive first request information from an NFVO, where the first request information is for requesting to establish a first service access point, the first service access point is configured to connect to a connectivity service endpoint via a first network, and is configured to connect to a virtual link corresponding to an identifier of at least one virtual link descriptor, where the identifier of the virtual link descriptor identifies the virtual link descriptor, the virtual link descriptor indicates a requirement for creating a virtual link connected to the first service access point, and the connectivity service endpoint is configured to connect a data center and a universal transmission network that are managed by a virtualized infrastructure manager VIM.

The processing module 802 is configured to establish the first service access point based on the first request information.

In some embodiments, the transceiver module 801 is further configured to receive second request information from the NFVO, where the second request information is for requesting to set an interface that connects the connectivity service endpoint to the universal transmission network as a second network, and is for mapping an identifier of the second network to an identifier of the first network on the connectivity service endpoint, and the identifier of the second network is used by the connectivity service endpoint to access the universal transmission network; and the transceiver module 802 is further configured to send the second request information to the connectivity service endpoint.

In some embodiments, the first network is a deployed network or an undeployed network.

When the communication apparatus 80 is configured to implement functions of the VIM, for other functions that can be implemented by the communication apparatus 80, refer to related descriptions of the embodiment shown in FIG. 5, the method embodiment shown in FIG. 6, or the embodiment shown in FIG. 7. Details are not described again.

Figure 9:
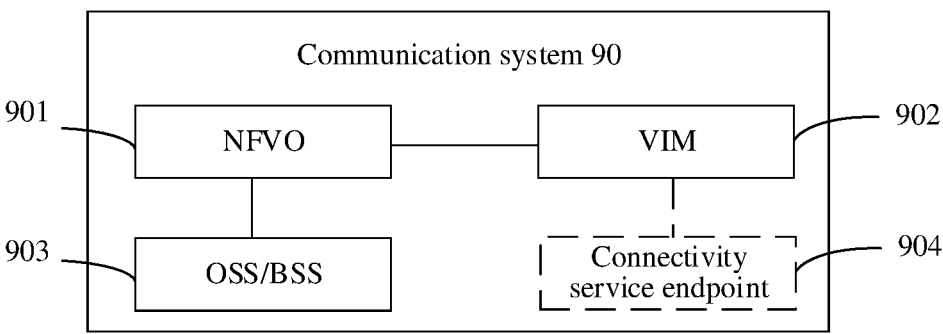
FIG. 9 is a schematic composition diagram of a communication system according to an embodiment of this application.

FIG. 9 is a schematic composition diagram of a communication system. As shown in FIG. 9, the communication system 90 may include an NFVO 901, a VIM 902, and an OSS/BSS 903. It should be noted that FIG. 9 is merely an accompanying drawing of an example, and network elements included in the communication system 90 shown in FIG. 9 and a quantity of network elements are not limited in this embodiment of this application.

The NFVO 901 is configured to implement functions of the NFVO in the method embodiments shown in FIG. 5 to FIG. 7. For example, the NFVO 901 may be configured to receive NS instantiation request information from the OSS/BSS 903, obtain an identifier of a first service access point descriptor, an identifier of at least one virtual link descriptor, information about a virtual link descriptor corresponding to an identifier of each virtual link descriptor, and information about an external network based on the NS instantiation request information, and send first request information to the VIM 902.

The VIM 902 is configured to implement functions of the VIM in the method embodiments shown in FIG. 5 to FIG. 7. For example, the VIM 902 may be configured to receive the first request information from the NFVO 901, and establish a first service access point based on the first request information.

The OSS/BSS 903 is configured to implement functions of the OSS/BSS in the method embodiments shown in FIG. 5 to FIG. 7. For example, the OSS/BSS 903 may be configured to send the NS instantiation request information to the NFVO 901.

In some embodiments, the communication system 90 further includes a connectivity service endpoint 904. The connectivity service endpoint 904 is configured to implement functions of the connectivity service endpoint in the method embodiments shown in FIG. 6 and FIG. 7. For example, the connectivity service endpoint 904 may be configured to receive a second request information from the VIM 902, set a connection interface between the connectivity service endpoint 904 and the universal transmission network as a second network based on the second request information, and map, on the connectivity service endpoint, an identifier of the second network to an identifier of the first network.

It should be noted that, all related content of the steps in the foregoing method embodiments may be referenced to function descriptions of corresponding network elements of the communication system 90, and details are not described herein again.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation.

For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the technology of some approaches, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for establishing a network connection, wherein the method comprises:

receiving network service (NS) instantiation request information from an operation support system/business support system (OSS/BSS);

obtaining an identifier of a first service access point descriptor, an identifier of at least one virtual link descriptor, information about a virtual link descriptor corresponding to an identifier of each virtual link descriptor, and information about an external network based on the NS instantiation request information, wherein the information about the virtual link descriptor is useable to indicate a requirement for creating a first virtual link connected to a first service access point, the information about the external network comprises:

an identifier of a first network; and an identifier of a connectivity service endpoint, wherein the first network is configured to connect the first service access point to the connectivity service endpoint, and the connectivity service endpoint is configured to connect a data center and a universal transmission network that are managed by a virtualized infrastructure manager (VIM); and sending first request information to the VIM, wherein the first request information is useable for requesting to establish the first service access point, and the first service access point is configured to connect to the connectivity service endpoint via the first network, and is configured to connect to a second virtual link corresponding to the identifier of the at least one virtual link descriptor;

wherein the NS instantiation request information comprises an identifier of an NS instance, the information about the external network, and information about a transmission network, the information about the transmission network comprises:

the identifier of the first service access point descriptor, the identifier of the connectivity service endpoint, and an identifier of a second network, and the identifier of the second network is useable by the connectivity service endpoint to access the universal transmission network.

2. The method according to claim 1, wherein the obtaining the identifier of the first service access point descriptor, the identifier of the at least one virtual link descriptor, the information about the virtual link descriptor corresponding to the identifier of each virtual link descriptor, and the information about the external network based on the NS instantiation request information comprises:

obtaining, based on the NS instantiation request information, the information about the external network and a network service descriptor (NSD) file corresponding to the identifier of the NS instance, wherein the NSD file comprises:

information about the first service access point descriptor; and the information about the virtual link descriptor, and the information about the first service access point descriptor comprises:

the identifier of the first service access point descriptor; and the identifier of the at least one virtual link descriptor.

3. The method according to claim 2, wherein the method further comprises:

receiving information about a transmission network from the OSS/BSS, wherein the information about the transmission network comprises:

the identifier of the first service access point descriptor, the identifier of the connectivity service endpoint, and an identifier of a second network, and the identifier of the second network is useable by the connectivity service endpoint to access the universal transmission network.

4. The method according to claim 3, wherein the information about the transmission network is comprised in an NS instantiation update request.

5. The method according to claim 1, wherein the NS instantiation request information comprises an identifier of an NS instance; and the obtaining the identifier of the first service access point descriptor, the identifier of the at least one virtual link descriptor, the information about the virtual link descriptor corresponding to the identifier of each virtual link descriptor, and the information about the external network based on the NS instantiation request information comprises:

obtaining a network service descriptor (NSD) file corresponding to the identifier of the NS instance, wherein the NSD file comprises:

information about the first service access point descriptor, and the information about the virtual link descriptor, and the information about the first service access point descriptor comprises:

the identifier of the first service access point descriptor, the identifier of the at least one virtual link descriptor, and the information about the external network.

6. The method according to claim 5, wherein the NS instantiation request information further comprises information about a transmission network, the information about the transmission network comprises:

the identifier of the first service access point descriptor, the identifier of the connectivity service endpoint, and an identifier of a second network, and the identifier of the second network is useable by the connectivity service endpoint to access the universal transmission network.

7. A method for establishing a network connection, wherein the method comprises:

receiving first request information from a network function virtualization orchestrator (NFVO), wherein the first request information is useable for requesting to establish a first service access point, the first service access point is configured to connect to a connectivity service endpoint via a first network, and is configured to connect to a first virtual link corresponding to an identifier of at least one virtual link descriptor, wherein the identifier of the at least one virtual link descriptor is useable to identify the virtual link descriptor, the virtual link descriptor is useable to indicate a requirement for creating a second virtual link connected to the first service access point, and the connectivity service endpoint is configured to connect a data center and a universal transmission network that are managed by a virtualized infrastructure manager (VIM);

establishing the first service access point based on the first request information;

receiving second request information from the NFVO, wherein the second request information is useable for requesting to set an interface that is useable for connecting the connectivity service endpoint to the universal transmission network as a second network, and is useable for mapping an identifier of the second network to an identifier of the first network on the connectivity service endpoint, and the identifier of the second network is useable by the connectivity service endpoint to access the universal transmission network; and sending the second request information to the connectivity service endpoint.

8. The method according to claim 7, wherein the first network is a deployed network or an undeployed network.

9. A communication apparatus, wherein the communication apparatus comprises a transceiver and a processor, wherein the transceiver is configured to receive network service (NS) instantiation request information from an operation support system/business support system (OSS/BSS);

the processor is configured to obtain an identifier of a first service access point descriptor, an identifier of at least one virtual link descriptor, information about a virtual link descriptor corresponding to an identifier of each virtual link descriptor, and information about an external network based on the NS instantiation request information, wherein the information about the virtual link descriptor is useable to indicate a requirement for creating a first virtual link connected to a first service access point, the information about the external network comprises:

an identifier of a first network; and an identifier of a connectivity service endpoint, wherein the first network is configured to connect the first service access point to the connectivity service endpoint, and the connectivity service endpoint is configured to connect a data center and a universal transmission network that are managed by a virtualized infrastructure manager (VIM); and the transceiver is further configured to send first request information to the VIM, wherein the first request information is useable for requesting to establish the first service access point, and the first service access point is configured to connect to the connectivity service endpoint via the first network, and is configured to connect to a second virtual link corresponding to the identifier of the at least one virtual link descriptor;

wherein the NS instantiation request information comprises an identifier of an NS instance, the information about the external network and information about a transmission network; and the information about the transmission network comprises:

the identifier of the first service access point descriptor, the identifier of the connectivity service endpoint, and an identifier of a second network, and the identifier of the second network is useable by the connectivity service endpoint to access the universal transmission network.

10. The communication apparatus according to claim 9, wherein the processor is further configured to obtain, based on the NS instantiation request information, the information about the external network and a network service descriptor (NSD) file corresponding to the identifier of the NS instance, wherein the NSD file comprises:

information about the first service access point descriptor; and the information about the virtual link descriptor, and the information about the first service access point descriptor comprises:

the identifier of the first service access point descriptor; and the identifier of the at least one virtual link descriptor.

11. The communication apparatus according to claim 10, wherein the transceiver is further configured to receive information about a transmission network from the OSS/BSS, wherein the information about the transmission network comprises:

the identifier of the first service access point descriptor, the identifier of the connectivity service endpoint, and an identifier of a second network, and the identifier of the second network is useable by the connectivity service endpoint to access the universal transmission network.

12. The communication apparatus according to claim 11, wherein the information about the transmission network is comprised in an NS instantiation update request.

13. The communication apparatus according to claim 9, wherein the NS instantiation request information comprises an identifier of an NS instance; and the processor is further configured to obtain a network service descriptor (NSD) file corresponding to the identifier of the NS instance, wherein the NSD file comprises:

information about the first service access point descriptor, and the information about the virtual link descriptor, and the information about the first service access point descriptor comprises:

the identifier of the first service access point descriptor, the identifier of the at least one virtual link descriptor, and the information about the external network.

14. The communication apparatus according to claim 13, wherein the NS instantiation request information further comprises information about a transmission network, the information about the transmission network comprises:

the identifier of the first service access point descriptor, the identifier of the connectivity service endpoint, and an identifier of a second network, and the identifier of the second network is useable by the connectivity service endpoint to access the universal transmission network.

15. A communication apparatus, wherein the communication apparatus comprises a transceiver module and a processor, wherein the transceiver is configured to receive first request information from a network function virtualization orchestrator (NFVO), wherein the first request information is useable for requesting to establish a first service access point, the first service access point is configured to connect to a connectivity service endpoint via a first network, and is configured to connect to a first virtual link corresponding to an identifier of at least one virtual link descriptor, wherein the identifier of the at least one virtual link descriptor is useable to identify the virtual link descriptor, the virtual link descriptor is useable to indicate a requirement for creating a second virtual link connected to the first service access point, and the connectivity service endpoint is configured to connect a data center and a universal transmission network that are managed by a virtualized infrastructure manager (VIM);

the processor is configured to establish the first service access point based on the first request information; and the transceiver is further configured to:

receive second request information from the NFVO, wherein the second request information is useable for requesting to set an interface that is useable for connecting the connectivity service endpoint to the universal transmission network as a second network, and is useable for mapping an identifier of the second network to an identifier of the first network on the connectivity service endpoint, and the identifier of the second network is useable by the connectivity service endpoint to access the universal transmission network; and send the second request information to the connectivity service endpoint.

16. The communication apparatus according to claim 15, wherein the first network is a deployed network or an undeployed network.

* * * * *